No. 688,203. Patented Dec. 3, 1901.
W. W. SELLERS.
HARNESS SHIELD ATTACHMENT.
(Application filed Aug. 20, 1901.)
(No Model.)
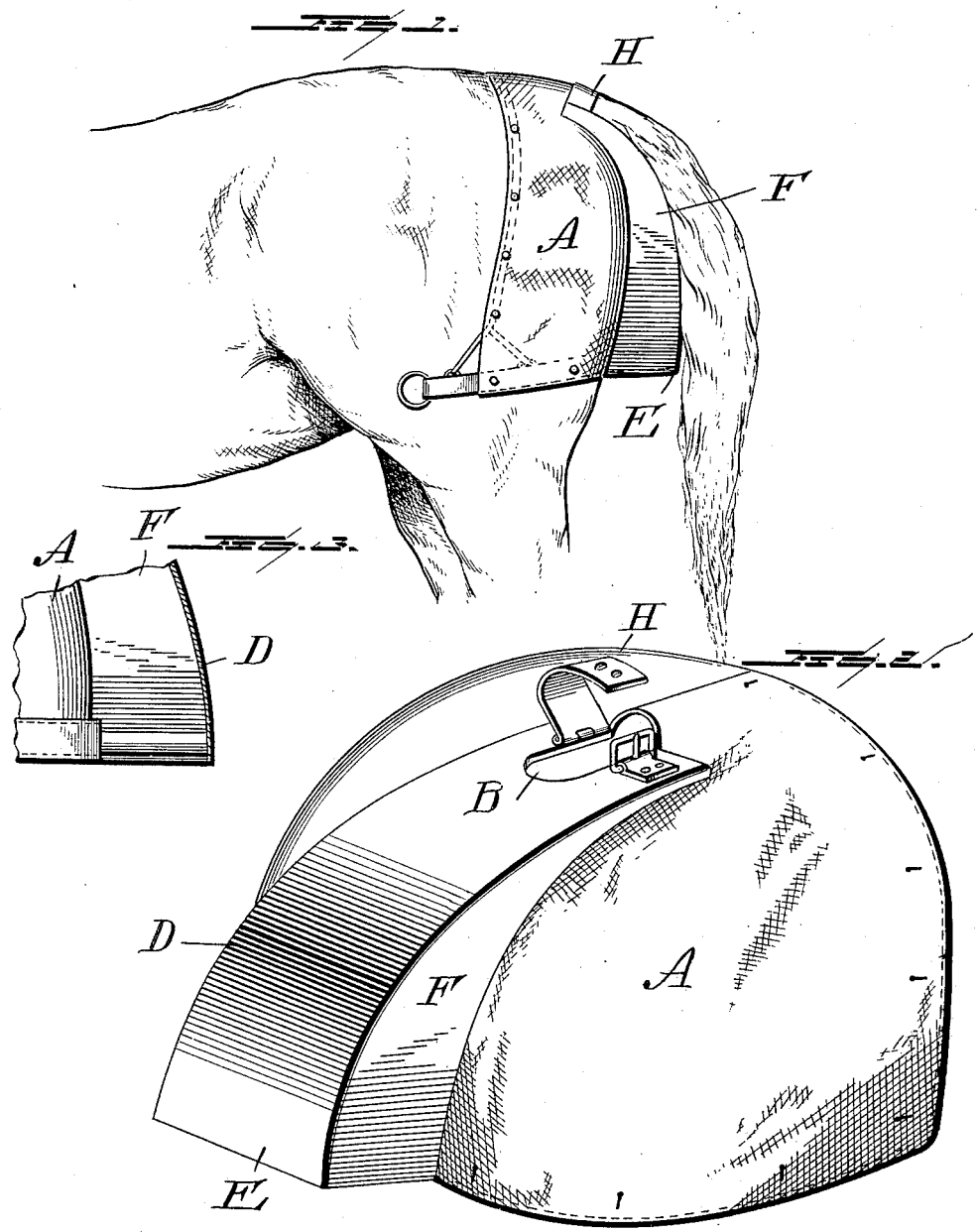

UNITED STATES PATENT OFFICE.

WILLIAM WALTER SELLERS, OF PINE BLUFF, ARKANSAS.

HARNESS-SHIELD ATTACHMENT.

SPECIFICATION forming part of Letters Patent No. 688,203, dated December 3, 1901.

Application filed August 20, 1901. Serial No. 72,698. (No model.)

*To all whom it may concern:*

Be it known that I, WILLIAM WALTER SELLERS, a citizen of the United States, residing at Pine Bluff, in the county of Jefferson and State of Arkansas, have invented certain new and useful Improvements in Harness-Shield Attachments; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in harness attachments and especially to a guard which is designed to be adjusted over the haunch of an animal and underneath the tail, means being provided to hold the guard in place by buttons or other fastening devices on the harness and a securing attachment for the tail.

The invention relates, further, to various details of construction and combination of parts, as will be hereinafter more fully described and then specifically defined in the appended claim.

The invention is clearly illustrated in the accompanying drawings, which, with the letters of reference marked thereon, form a part of this application, and in which—

Figure 1 is a perspective view of the device shown as attached to a horse. Fig. 2 is an enlarged detail view of the guard detached. Fig. 3 is a sectional view vertically and centrally through the guard.

Reference now being had to the details of the drawings by letter, A designates the body portion, made of cloth, of the guard, which is provided with buttonholes whereby the device may be attached to the harness by means of buttons, as shown.

D designates a shield made, preferably, of metal, fastened to said body portion, and B is an aperture adjacent to the highest part of the shield and in which the fleshy part of the tail is adapted to rest. Below said aperture said shield curves downward and away from the body portion and terminates at E flush with the lower edge of the body portion. The tail of the animal is adapted to rest over the curved shield and extend down beyond the lower end thereof. The tail after being passed through the aperture B may be held to the shield by means of strap H.

Within the lower portion of the shield are stays, one of which shows in Fig. 3 of the drawings, which stays bear between the breeching and the lower end of the shield and serve to hold the shield at a fixed distance from the body of the animal and prevent the shield from being crushed in.

From the foregoing it will be observed that a shield made in accordance with my invention may be easily applied to any harness, and by its use the haunch of a horse or mule will be completely covered up.

Having thus described my invention, what I claim to be new, and desire to secure by Letters Patent, is—

An attachment for harnesses, comprising a shield D of box-like form with aperture B therein, to receive the fleshy part of the tail of an animal, said shield having a curved shape and a body portion fastened thereto, which is designed to conform to the shape of the haunches of the horse, means for attaching same to a harness, stays in the lower portion of the shield bearing between the inner wall of the latter and the breeching of a harness, to strengthen the shield, a strap secured to the upper end of the shield on one side of the aperture therein, and adapted to pass over the tail of an animal, and be buckled on the other side of the aperture in the shield, as set forth.

In testimony whereof I hereunto affix my signature in presence of two witnesses.

WILLIAM WALTER SELLERS.

Witnesses:
L. T. SALLEE,
CHARLES F. MOORE.